United States Patent
Sharma et al.

(10) Patent No.: US 11,212,687 B2
(45) Date of Patent: Dec. 28, 2021

(54) METHOD AND SYSTEM FOR CONTROLLING AN OPERATION OF A COMMUNICATION NETWORK TO REDUCE LATENCY

(71) Applicant: Nokia Solutions and Networks Oy, Espoo (FI)

(72) Inventors: Sameerkumar Sharma, Holmdel, NJ (US); Edward Grinshpun, Freehold, NJ (US); Andrea Francini, Rumson, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/969,843

(22) PCT Filed: Feb. 25, 2018

(86) PCT No.: PCT/US2018/019605
§ 371 (c)(1),
(2) Date: Aug. 13, 2020

(87) PCT Pub. No.: WO2019/164517
PCT Pub. Date: Aug. 29, 2019

(65) Prior Publication Data
US 2020/0389804 A1    Dec. 10, 2020

(51) Int. Cl.
*H04W 24/08* (2009.01)
*H04W 76/11* (2018.01)
(Continued)

(52) U.S. Cl.
CPC ........... *H04W 24/08* (2013.01); *H04J 3/0661* (2013.01); *H04W 56/001* (2013.01); *H04W 76/11* (2018.02)

(58) Field of Classification Search
CPC ..... H04W 16/02; H04W 16/14; H04W 24/06; H04W 24/08; H04W 24/10; H04W 76/11;
(Continued)

(56) References Cited

U.S. PATENT DOCUMENTS 9,794,825 B2    10/2017  Grinshpun et al.
10,986,516 B2 *  4/2021  Dao ...................... H04W 24/08
(Continued)

OTHER PUBLICATIONS

E. Grinshpun et al., "Long-term application-level wireless link quality prediction," *36th IEEE Sarnoff Symposium*, Sep. 2015.
(Continued)

*Primary Examiner* — Jean A Gelin
(74) *Attorney, Agent, or Firm* — Harness, Dickey & Pierce, P.L.C.

(57) ABSTRACT

The method includes transmitting request messages to at least one first network node, the request messages each including at least a sampling time-window and a network slice identifier, the sampling time-window defining a duration of time, the network slice identifier identifying a designated network slice within the communication network, receiving packet reports from the at least one first network node, the packet reports including latency information for packets that are processed by the at least one first network node during the sampling time-window for the designated network slice, and controlling the operation of the communication network based on the latency information.

20 Claims, 8 Drawing Sheets

(51) Int. Cl.
  *H04J 3/06* (2006.01)
  *H04W 56/00* (2009.01)
(58) Field of Classification Search
  CPC ... H04W 84/042; H04W 48/17; H04W 48/18; H04W 48/20; H04W 72/048; H04W 72/0486; H04W 72/12; H04J 3/0661
  See application file for complete search history.

(56) References Cited

U.S. PATENT DOCUMENTS

| | | | | |
|---|---|---|---|---|
| 2013/0198404 | A1* | 8/2013 | Basse | H04N 7/20 709/231 |
| 2014/0310235 | A1 | 10/2014 | Chan et al. | |
| 2017/0079059 | A1 | 3/2017 | Li et al. | |
| 2017/0245316 | A1* | 8/2017 | Salkintzis | H04W 48/16 |
| 2017/0367036 | A1 | 12/2017 | Chen et al. | |
| 2018/0035399 | A1 | 2/2018 | Xu et al. | |
| 2018/0227080 | A1* | 8/2018 | Stein | H04J 3/0673 |
| 2018/0262924 | A1* | 9/2018 | Dao | H04W 72/1257 |
| 2018/0317133 | A1* | 11/2018 | Sciancalepore | H04W 16/02 |
| 2019/0075552 | A1* | 3/2019 | Yu | H04W 72/04 |
| 2019/0124704 | A1* | 4/2019 | Sun | H04W 76/10 |
| 2019/0261425 | A1* | 8/2019 | Park | H04L 1/0026 |
| 2019/0281541 | A1* | 9/2019 | Zhang | H04W 36/00 |
| 2019/0349774 | A1* | 11/2019 | Lou | H04W 16/10 |
| 2020/0068473 | A1* | 2/2020 | Tang | H04W 36/00837 |
| 2020/0177311 | A1* | 6/2020 | Ho | H04L 1/0009 |
| 2020/0213992 | A1* | 7/2020 | Hoffmann | H04W 72/087 |
| 2020/0275356 | A1* | 8/2020 | Forsman | H04L 41/0803 |
| 2020/0305054 | A1* | 9/2020 | Zee | H04W 36/0058 |
| 2020/0314656 | A1* | 10/2020 | Maguire | H04W 16/02 |
| 2021/0153077 | A1* | 5/2021 | Samdanis | H04W 24/02 |

OTHER PUBLICATIONS

"Dynamic end-to-end network slicing for 5G—addressing 5G requirements for diverse services, use cases, and business models," Nokia White Paper, published Dec. 2016.
International Search Report PCT/ISA/210 for Application PCT/US2018/019605, dated Apr. 9, 2018.
Written Opinion PCT/ISA/237 for Application PCT/US2018/019605, dated Apr. 30, 2018.
European Search Report dated Oct. 5, 2021, issued in corresponding European Patent Application No. 18907085.7.

* cited by examiner

METHOD AND SYSTEM FOR CONTROLLING AN OPERATION OF A COMMUNICATION NETWORK TO REDUCE LATENCY

This application is a national phase under 35 U.S.C. § 371 of PCT International Application No. PCT/US2018/019605, which has an International filing date of Feb. 25, 2018; the entire contents of each of which are incorporated herein by reference.

BACKGROUND

Field

Example embodiments relate generally to a method and a system for controlling an operation of a communication network by measuring and monitoring network latency. The method and system have applicability to packet-switched networks, including $5^{th}$ generation wireless communication networks (5G networks).

Related Art

Communication networks continuously receive new service demands from a variety of users, machines, industries, governments, and other organizations. In a $5^{th}$ generation wireless communication network (5G network), new services will be supported and enabled by dedicated, secure, customized end-to-end network slices. Network slices support their associated services and ensure isolation of their traffic within a shared physical infrastructure by means of dedicated virtualized network functions in the data and control planes.

Many of the new services and applications (for example, virtual reality (VR), network-assisted autonomous control of vehicles and drones, network-assisted automated factories and cities, remote robot control, remote surgery, etc.) have stringent end-to-end latency requirements while they generate "bursty" network traffic (i.e., traffic with intervals of high load demands). End-to-end latency is expected to be a prominent key performance indicator (KPI) in the service level agreements (SLAs) associated with these services and their respective network slices.

SUMMARY

At least one example embodiment includes a method of controlling an operation of a communication network.

In one example embodiment, the method includes transmitting, by at least one first processor of a central node, request messages to at least one first network node, the request messages each including at least a sampling time-window and a network slice identifier, the sampling time-window defining a duration of time, the network slice identifier identifying a designated network slice within the communication network; receiving, at the at least one first processor, packet reports from the at least one first network node, the packet reports including latency information for packets that are processed by the at least one first network node during the sampling time-window for the designated network slice; and controlling, by the at least one first processor, the operation of the communication network based on the latency information.

In one example embodiment, the at least one first network node includes at least one first-type of network node with a first link in the designated network slice, the first link having a termination endpoint that is within the communication network.

In one example embodiment, the at least one first network node includes at least one second-type of network node with a second link in the designated network slice, the second link having a termination endpoint that is outside the network slice.

In one example embodiment, the receiving of the packet reports includes, receiving, from the first-type of network node, a first-type of packet reports for the designated network slice, the first-type of packet reports each including, packet identifier information, packet size information, and timestamp information.

In one example embodiment, the at least one first network node includes at least one first-type of network node with a first link in the designated network slice, the first link having a termination endpoint that is within the communication network, and the receiving of the packet reports includes, receiving, from the first-type of network node, a first-type of packet reports for the designated network slice, the first-type of packet reports each including, packet identifier information, packet size information, and timestamp information; and receiving, from the second-type of network node, a second-type of packet reports for the designated network slice, the second-type of packet reports each including latency information for the second-type of network node.

In one example embodiment, the network slice identifier identifies a direction of communication for the designated network slice, the direction being one of an uplink direction and a downlink direction.

In one example embodiment, the central node and the first-type of network node are synchronized to a same network clock for the communication network, and the request messages to the at least one first-type of network node includes a start time defined by the sampling time-window.

In one example embodiment, the at least one first-type of network node includes a downstream first-type of network node and an upstream first-type of network node, the transmitting of the request messages including, transmitting a first request message with a first sampling time-window to the downstream first-type of network node, the first sampling time-window defining a first start time and a first duration of time, and transmitting a second request message with a second sampling time-window to the upstream first-type of network node, the second sampling time-window defining a second start time and a second duration of time, the first duration of time being one of the same and different than the second duration of time.

In one example embodiment, the receiving of the packet reports includes, receiving a first packet report from the downstream first-type of network node, the first packet report including one first set of packet identifier information associated with one first set of timestamp information, and receiving a second packet report from the upstream first-type of network node, the second packet report including one second set of packet identifier information associated with one second set of timestamp information.

In one example embodiment, the method further includes calculating the latency information by, matching identifier information between the one first set of packet identifier information and the one second set of packet identifier information to arrive at a matched subset of identifier information, and determining a difference between a first portion of the one first set of timestamp information and a second portion of the one second set of timestamp information, the first and second portions being associated with the matched subset of identifier information.

At least another example embodiment is directed toward, one example embodiment a method of controlling an operation of a communication network in a system, the system including a central node and at least first network node.

In one example embodiment, the method includes transmitting, by at least one first processor of the central node, request messages to at least one second processor of the at least one first network node, the request messages each including at least a sampling time-window and a network slice identifier, the sampling time-window defining a duration of time, the network slice identifier identifying a designated network slice within the communication network; creating, by the at least one second processor, packet reports upon receipt of the request message, the packet reports including latency information for packets that are processed by the at least one first network node during the sampling time-window for the designated network slice; receiving, at the at least one first processor, the packet reports from the at least one second processor; and controlling, by the at least one first processor, the operation of the communication network based on the latency information.

In one example embodiment, the at least one first network node includes at least one first-type of network node with a first link in the designated network slice, the first link having a termination endpoint that is within the communication network.

In one example embodiment, the at least one first network node includes at least one second-type of network node with a second link in the designated network slice, the second link having a termination endpoint that is outside the network slice.

In one example embodiment, the receiving of the packet reports includes, receiving, from the first-type of network node, a first-type of packet reports for the designated network slice, the first-type of packet reports each including, packet identifier information, packet size information, and timestamp information.

In one example embodiment, the at least one first network node includes at least one first-type of network node with a first link in the designated network slice, the first link having a termination endpoint that is within the communication network, and the receiving of the packet reports includes, receiving, from the first-type of network node, a first-type of packet reports for the designated network slice, the first-type of packet reports each including, packet identifier information, packet size information, and timestamp information; and receiving, from the second-type of network node, a second-type of packet reports for the designated network slice, the second-type of packet reports each including latency information for the second-type of network node.

In one example embodiment, the network slice identifier identifies a direction of communication for the designated network slice, the direction being one of an uplink direction and a downlink direction.

In one example embodiment, the central node and the first-type of network node are synchronized to a same network clock for the communication network, and the request messages to the at least one first-type of network node includes a start time defined by the sampling time-window.

In one example embodiment, the at least one first-type of network node includes a downstream first-type of network node and an upstream first-type of network node, the transmitting of the request messages including, transmitting a first request message with a first sampling time-window to the downstream first-type of network node, the first sampling time-window defining a first start time and a first duration of time, and transmitting a second request message with a second sampling time-window to the upstream first-type of network node, the second sampling time-window defining a second start time and a second duration of time, the first duration of time being one of the same and different than the second duration of time.

In one example embodiment, the receiving of the packet reports includes, receiving a first packet report from the downstream first-type of network node, the first packet report including one first set of packet identifier information associated with one first set of timestamp information, and receiving a second packet report from the upstream first-type of network node, the second packet report including one second set of packet identifier information associated with one second set of timestamp information.

In one example embodiment, the method further includes calculating the latency information by, matching identifier information between the one first set of packet identifier information and the one second set of packet identifier information to arrive at a matched subset of identifier information, and determining a difference between a first portion of the one first set of timestamp information and a second portion of the one second set of timestamp information, the first and second portions being associated with the matched subset of identifier information.

In one example embodiment, the creating of the packet reports includes, calculating, by the at least one second processor of the at least one second-type of network node, physical resource block (PRB) rate information and bearer information that includes a quantification of a number of very active bearers, and determining, by the at least one second processor, the latency information based on the PRB rate information and the bearer information.

At least another example embodiment is directed toward a central node.

In one example embodiment, the central nodes includes a memory storing computer-readable instructions; and at least one first processor configured to execute the computer-readable instructions such that the at least one first processor is configured to, transmit request messages to at least one first network node, the request messages each including at least a sampling time-window and a network slice identifier, the sampling time-window defining a duration of time, the network slice identifier identifying a designated network slice within the communication network, receiving packet reports from the at least one first network node, the packet reports including latency information for packets that are processed by the at least one first network node during the sampling time-window for the designated network slice, and control the operation of the communication network based on the latency information.

At least another example embodiment includes a system.

In one example embodiment, the system includes a central node including, a first memory storing first computer-readable instructions, and at least one first processor configured to execute the first computer-readable instructions such that the at least one first processor is configured to, transmit request messages to the at least one second processor, the request messages each including at least a sampling time-window and a network slice identifier, the sampling time-window defining a duration of time, the network slice identifier identifying a designated network slice within the communication network; and at least one first network node including, a second memory storing second computer-readable instructions, and at least one second processor configured to execute the second computer-readable instructions such that the at least one second processor is configured to, create packet reports upon receipt of the request message, the packet reports including latency information for packets that are processed by the at least one first network node during the sampling time-window for the designated network slice, the at least one first processor being further configured to receive the packet reports from the at least one second processor, and control the operation of the communication network based on the latency information.

DETAILED DESCRIPTION

Figure 1:
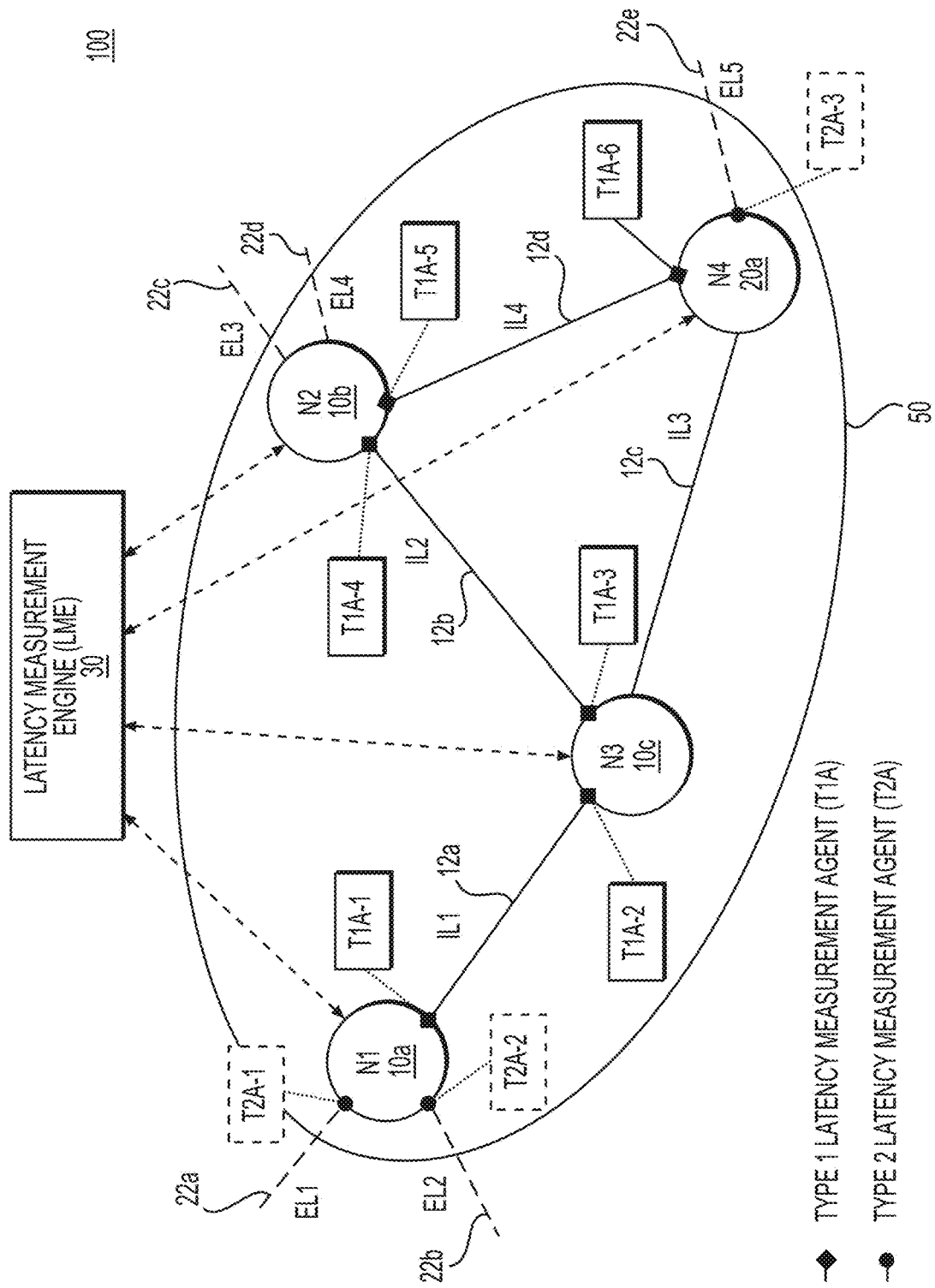
FIG. 1 illustrates an architecture of a system for a communication network, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic, optical, or flash memory, etc. Similarly, the transmission medium may be twisted wire pairs, coaxial cable, optical fiber, or some other suitable transmission medium known to the art. The example embodiments not limited by these aspects of any given implementation.

General Methodology

To ensure service level agreements (SLA) compliance for network slices, 5G Service Providers (SPs) need reliable and cost-effective means for real-time measurement and monitoring of latency. Passive methods for latency measurement do not inject dedicated measurement traffic in the data plane and do not modify the headers of user traffic. Service providers can benefit from such passive methods because they do not interfere with network performance and data usage-based charging schemes. Relevant latency metrics include the end-to-end latency per slice between service endpoints, and the latency of traversal of partial segments of the end-to-end network slice, such as individual virtual links, sub-slices, and virtual network functions. The latter provides significant benefits in increasing a capability for troubleshooting, root-cause analysis, and implementation of corrective actions to preserve SLA guarantees. The instant example embodiments include a system and method for passive, accurate, and scalable measurement of latency for network slices.

Limited methods exist for latency measurement, but they are either (a) inadequate to meet the new requirements associated with 5G and the network slicing concept, or (b) non-passive and intrusive in nature, and therefore limited in applicability. The following is a representative set of such techniques:

I. Active measurements: Using conventional diagnostic tools, the end host or network node may inject special round-trip packets into the network (a round-trip packet is a data packet that travels from a first network endpoint to a second network endpoint, and then returns to the first endpoint; the data in the packet may be modified as the packet travels in each direction, and also by the second endpoint before transmission to the first endpoint). Each returning round-trip packet contains a timestamp of the original packet, and added timestamps can possibly be added by a remote host and intermediate nodes. The source analyzes the timestamps to infer latency information for the overall and partial data paths. This method is not adequate for 5G network slices and their stringent SLA key performance indicators (KPIs), for at least the following reasons.

A. The diagnostic tools involved are not passive: The injected packets increase the network load. While the load increase is typically marginal, there are cases where it can perturb the performance of latency-sensitive applications and their KPI measures.

B. Designated new functions need to be installed on mobile end devices specifically to produce latency measurements and then signal the measurement results to the network, which requires agreement of the end users and pose a burden due to the sheer number of end devices.

C. In a network slicing environment, the packet probes of the latency measurement utilities do not undergo the same type of processing as the packets of the applications that each slice is designed to support. As processing contributes to latency, the measurements obtained from the probes may be inaccurate.

II. TCP header inspection: Using a sequence number in a header of transmission control protocol (TCP) data packets, and an acknowledgment number in the header of the returning acknowledgment (ACK) packets, an intermediate network node, and not just the TCP source, can compute a round-trip time to a TCP receiver. This method is only suitable for applications that use TCP for end-to-end transport. Real-time applications with constrained latency requirements are unlikely to use TCP for end-to-end transport because of a delay added by TCP packet retransmissions. Transport protocols better tailored to the specific needs of each application are likely to become commonplace, especially after an introduction of industry quick user datagram protocol (UDP) internet connection protocol (i.e., QUIC protocol), as a shim layer above UDP that allows a design of custom methods for network reliability and congestion control.

III. Deep packet inspection (DPI) or other methods for signature-based packet identification: Intermediate nodes can look deep into a packet (both header and payload) to identify packet flows and individual packets and store per-flow and per-packet arrival/departure data. An inter-node one-way latency sample can be computed by matching the records collected at neighboring nodes for the same packet. This approach faces the following challenges:

A. Large amounts of packet arrival/departure records need to be stored at each participating node and then transferred for matching. Randomly sampling only a fraction of the packets in transit does not work, because the latency calculation must compare event times at different nodes for the same packet and the likelihood of sampling the same packet at different nodes is low if every node samples packets randomly and independently of the other nodes.

B. The method is only suitable for the measurement of latency for segments of a slice, and not of an end-to-end one-way latency of a multi-hop data path of a network slice.

The ability to configure overbooking of the shared network and computing resources by different slices is desirable for a communication network operator to enable maximum utilization of the network and thereby maximum return on the infrastructure investment.

Therefore, the example embodiments provide a system and a method that includes two types of distributed agents that may coordinate latency measurements of slices with a central node for designated network slices, where the distributed agents may be associated either with links within the communications network, or links that are used for communications that are external to the communication network. The method and system can compute (a) end-to-end slice latency and (b) latency for individual segments of the slice.

Specific Embodiments

The example embodiments consist of a system and method for a passive measurement of packet latency in a network slice, both for end-to-end latency (between the slice endpoints), and within internal segments of the overall slice, where a segment may be a subnet of the slice, a link (physical or virtual) within the slice, a set of consecutive links within the slice, a network node associated with the slice, or a well-defined network domain that is a part of the slice, etc. The latency measurements may be produced by a centralized element (also referred to as a "central node," or a "control node") that controls and coordinates periodic sampling by individual elements or nodes in the communication network, and periodically collects and correlates sets of packet timestamp records received from different sampling points of the network. A packet timestamp record (also referred to as "timestamp information") may consist of a unique packet identifier and a timestamp associated with the time of record creation. A record is created for every packet that traverses the sampling point during a record collection period. The comparison of the timestamps associated with the same packet identifier in records received from different points in the network yields a sample of the latency between the two points. The centralized element controls the duration of each record collection period, the interval between collection periods, and the start time of the collection period at each point of the network involved in the process.

Some key elements of the example embodiments are summarized by the following attributes:

I. Network-based: The example embodiments do not require the participation of end devices in the measurements.

II. Passive: The example embodiments do not involve an injection of probe packets, or a modification of the headers of transmitted packets for the system or method.

III. Scalable: The example embodiments rely on sampling transmitted packets at intermittent time intervals that are compatible with the processing, storage, and transmission capacities of the nodes where the sampling occurs.

IV. Accurate: The example embodiments enable the fine-tuning of a latency measurement procedure based on characteristics of the data path where it is applied.

Structural Embodiments

FIG. 1 illustrates the architecture of a system 100 for a communication network 50, in accordance with an example embodiment. The system 100 may provide latency measurements, and thereby obtain latency information. The system 100 may provide latency measurements (information) for a packet network that consists of a set of nodes {N-i}(10a, 10b, 10c, 20a), a set of internal links {IL-j} (12a, 12b, 12c, 12d), and a set of external links {EL-k} (22a). A node N-i may be a packet switch, a portion of a packet switch, a network function, a network capability, an application server or endpoint, or any other network element that is capable of receiving and transmitting packets, with no restriction on scope and granularity. The nodes N-i may by instantiated as physical standalone entities or as virtualized entities, possibly sharing an underlying infrastructure resource with other virtualized network functions. An internal link IL-j connects two of the nodes within the communication network 50. An external link EL-k connects a node of the communication network 50 with a node that does not belong to the communication network 50. A wireless connection between a serving cell and served end user device is an example of an external link 22a. Both internal and external links may be either physical or virtual links.

The system 100 of the example embodiments includes the following components:

A. The Latency Measurement Engine (LME) 30: A centralized component (a "central node," or "control node," or Latency Measurement Engine "LME") 30 with a processor 300a that controls the synchronization of sampling (start and duration) at different nodes (10a, 10b, 10c and 20a) to ensure the timestamping of node traversal for a same set of packets. The processor 300a of the LME 30 collects and processes the latency measurements that originate from different points of the network 50. There generally may be one such engine (LME 30) per Operator Network (e.g. physical network or virtual network), though it should be understood that multiple LMEs 30 may be deployed within the same infrastructure or communication network 50, where the multiple LMEs 30 may be shared by a plurality of virtual networks or network slices.

B. Type 1 Latency Measurement Agents (T1LMAs)—First-Type of Network Node: Distributed components (or network nodes/elements, designated as nodes 10a, 10b and 10c in system 100) associated with the endpoints of internal links 12a. They collect time-synchronized measurement samples (a first type of measurement information) for one link 12a direction, or for both directions of the link 12a, and transmit this information to the processor 300 of LME 30. Not all internal links of a network node are necessarily coupled with a T1LMA.

C. Type 2 Latency Measurement Agents (T2LMAs)—Second-Type of Network Node: Distributed components (or network nodes/elements, designated as node 20a in system 100) associated with the network endpoints of external links 22e (i.e., links whose second endpoint is outside the network 50 and therefore not included in the measurement system). An example of an external link 22e is a wireless access link, where the outside endpoint is a mobile device (such as a user device/equipment) served by the network 50. T2LMAs collect measurement samples (a second type of measurement information) for one link 22e direction, or for both directions of the link 22e, and transmit the measurement information to the processor 300 of LME 30. Not all external links of a network node are necessarily coupled with a T2LMA.

D. The LME 30 and all LMAs 10a in the network 50: These components are synchronized to a common time reference (i.e., a common "network clock"). Any well-known method of causing this synchronization may be implemented, where this synchronization and the details of its implementation are outside the scope of the instant described example embodiments.

Structural Example Embodiments

Figure 2:
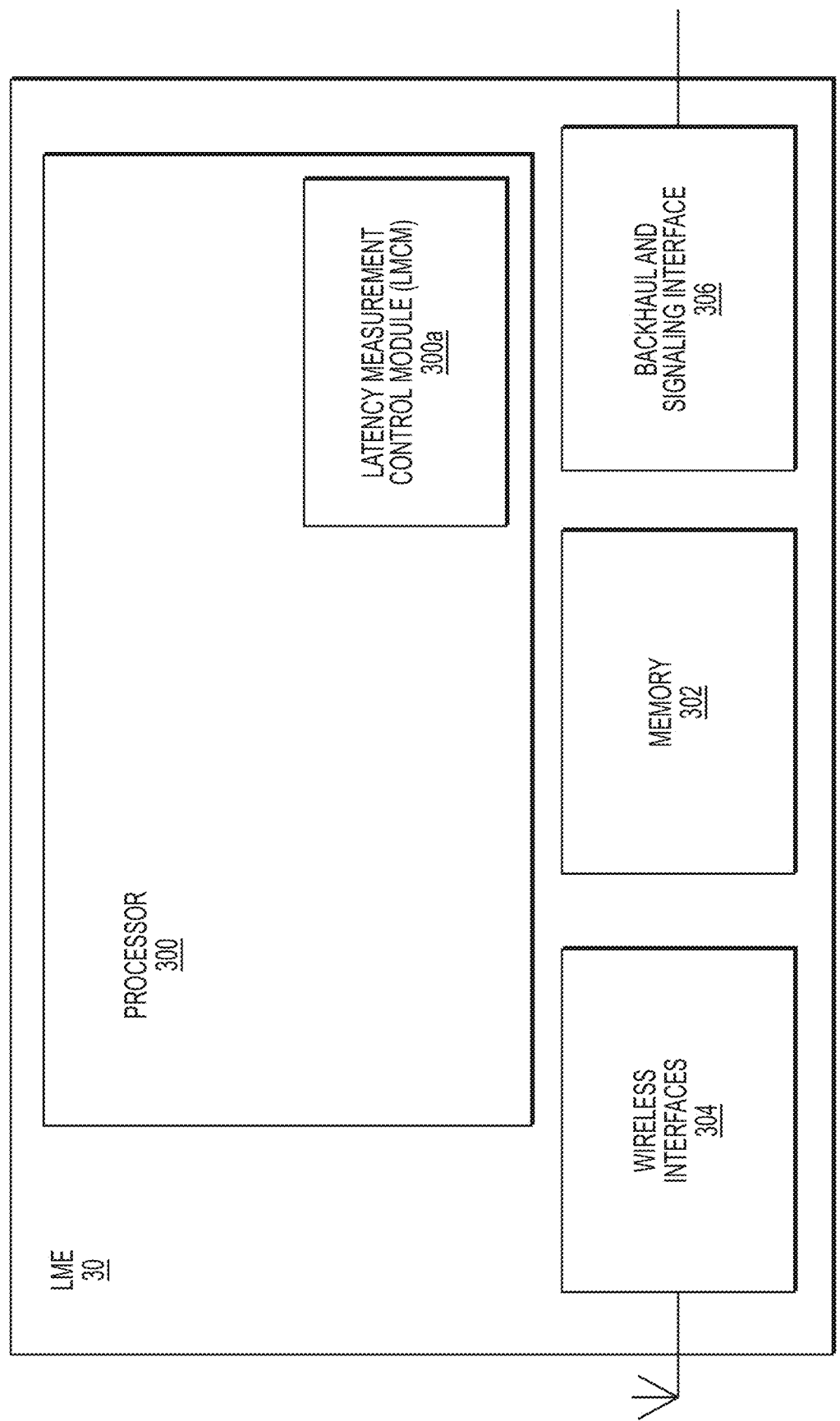
FIG. 2 illustrates a central (control) node of the system, in accordance with an example embodiment.

FIG. 2 illustrates a central (control) node 30, or LME 30, of the system 100, in accordance with an example embodiment. The node 30 includes network interfaces 304 (that may be wireless or wireline) to communicate with other nodes in the system 100, signaling interfaces 306 (that may be considered a "backhaul") and a memory storage 302. The node 30 also includes a processor 300 that may control the operations of the node 30. Some of these operations of the node 30 include: saving and retrieving information/data to and from the memory 302, transmitting signaling and information to other nodes in the system 100 using the interfaces 304/306, and performing processing based at least in part on computer-readable instructions that are saved in the latency measurement control module (LMCM) 300a within the processor 300. The computer-readable instructions in the LMCM 300a may provide instructions that cause the processor 300 to perform method steps for node 30 that are commensurate with the steps that are described in the instant method example embodiments in this document. It should be understood that the processor 300 also includes a physical (PHY) layer (with different configuration modes), a media access control (MAC) layer (with different configuration modes), a packet data convergence protocol (PDCP) layer (with different configuration modes), a user plane layer (with different configuration modes), a schedule and a radio link control (RLC) buffer, where these elements of the processor 300 are not shown in the drawings.

Figure 3:
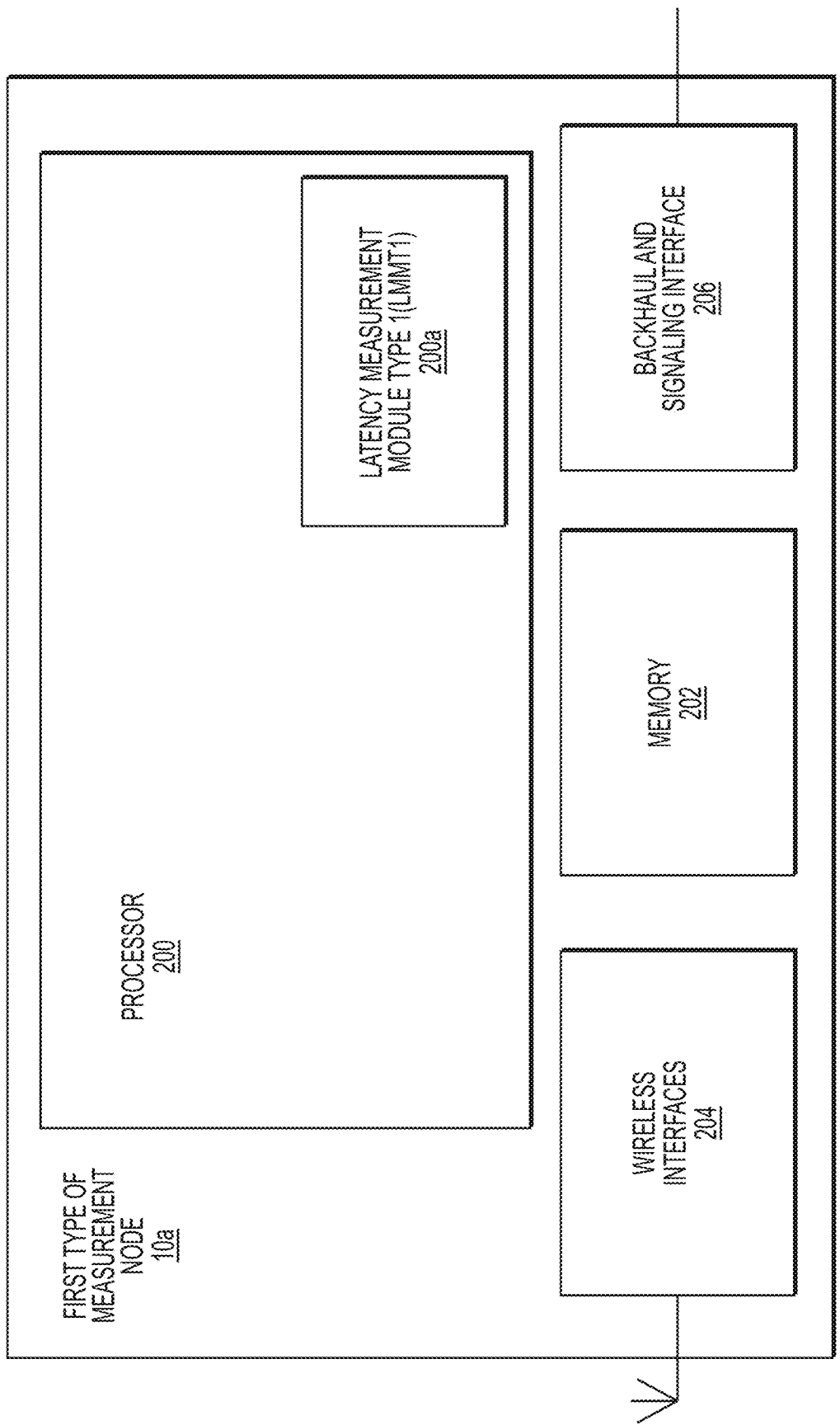
FIG. 3 illustrates a first measurement node of the system, in accordance with an example embodiment.

FIG. 3 illustrates a first measurement node 10a, or T1LMAs, of the system 100, in accordance with an example embodiment. The node 10a includes network interfaces 204 to communicate with other nodes in the system 100, a backhaul interface 206 and a memory storage 202. The node 10a also includes a processor 200 that may control the operations of the node 10a. Some of these operations of the node 10a include: saving and retrieving information/data to and from the memory 202, transmitting signaling and information to other nodes in the system 100 using the interfaces 204/206, and performing processing based at least in part on computer-readable instructions that are saved in the latency measurement module Type 1 (LMMT1) 200a within the processor 200. The computer-readable instructions in the LMMT1 200a may provide instructions that cause the processor 200 to perform method steps for node 10a that are commensurate with the steps that are described in the instant method example embodiments in this document. In an embodiment, the processor 200 may include a physical (PHY) layer (with different configuration modes), a media access control (MAC) layer (with different configuration modes), a packet data convergence protocol (PDCP) layer (with different configuration modes), a user plane layer (with different configuration modes), a schedule and a radio link control (RLC) buffer, where these elements of the processor 300 are not shown in the drawings.

Figure 4:
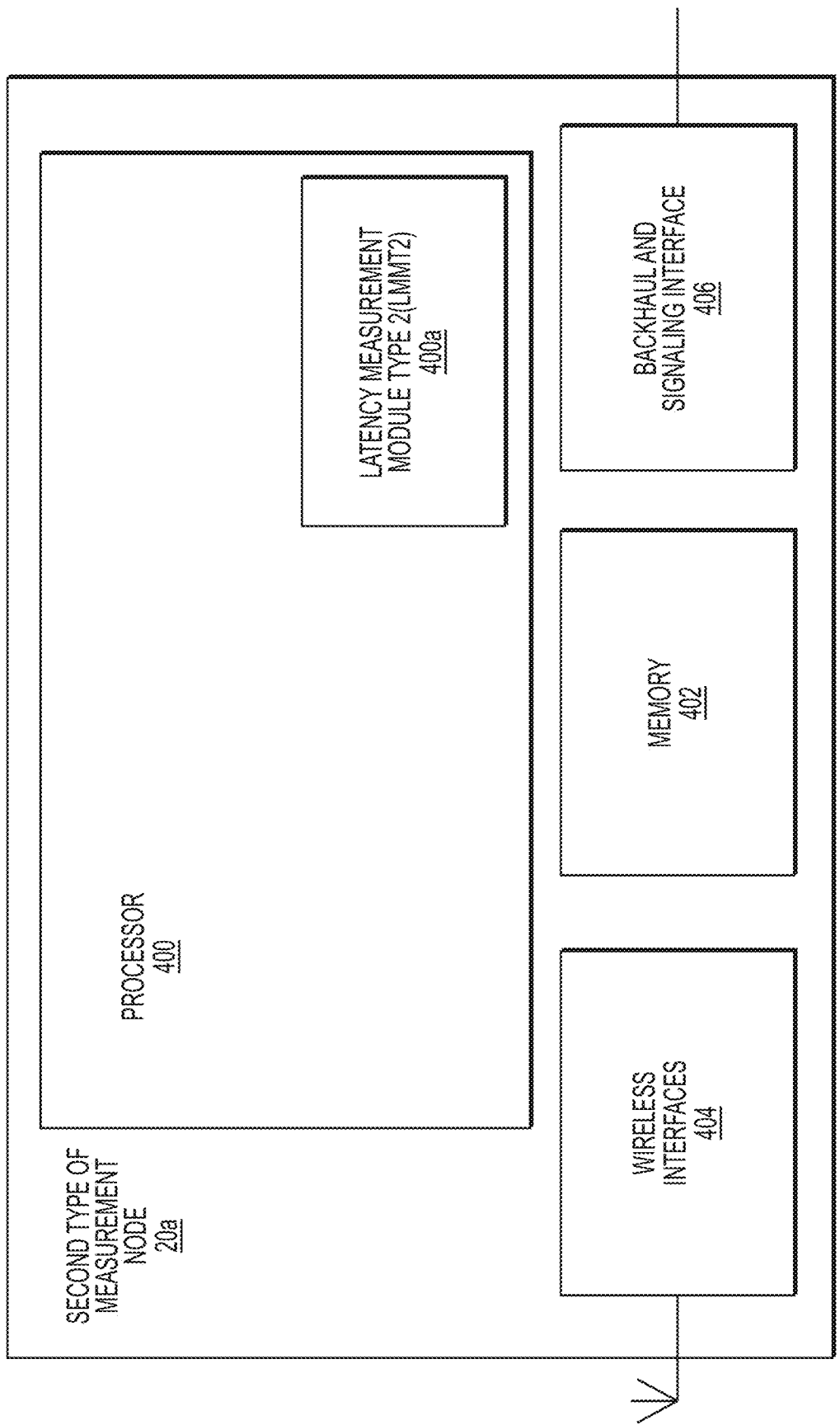
FIG. 4 illustrates a second measurement node of the system, in accordance with an example embodiment.

FIG. 4 illustrates a second measurement node 20a, or T2LMAs, of the system 100, in accordance with an example embodiment. The node 20a includes network interfaces 404 to communicate with other nodes in the system 100, a backhaul interface 406, and a memory storage 402. The node 20a also includes a processor 400 that may control the operations of the node 20a. Some of these operations of the node 20a include: saving and retrieving information/data to and from the memory 402, transmitting signaling and information to other nodes in the system 100 using the interfaces 404/406, and performing processing based at least in part on computer-readable instructions that are saved in the latency measurement module Type 2 (LMMT2) 400a within the processor 400. The computer-readable instructions in the LMMT2 400a may provide instructions that cause the processor 400 to perform method steps for node 20a that are commensurate with the steps that are described in the instant method example embodiments in this document. In an embodiment, the processor 400 may include a physical (PHY) layer (with different configuration modes), a media access control (MAC) layer (with different configuration modes), a packet data convergence protocol (PDCP) layer (with different configuration modes), a user plane layer (with different configuration modes), a schedule and a radio link control (RLC) buffer, where these elements of the processor 300 are not shown in the drawings.

Use of Network Slice within the System

The system 100 includes the two types of distributed agents 10a/20a that may be coupled with Virtual Network Functions for collecting latency related measurement samples pertaining to network slices (Type 1 and Type 2 Latency Measurement Agents), and are in communication with the centralized Latency Measurement Engine (LME) 30. The processor 300 of the LME 30 coordinates sampling operations and processes the agent data to compute (a) end-to-end slice latency and (b) latency for individual segments of the slice.

In an embodiment, the method includes:

I. Coordinating data sampling, performed by different agents 10a/20a, by the processor 300 of the LME 30.

II. A framework for controlling agent 10a/20a sampling operations, via continuous adaptation of a duration and frequency of sampling periods, and based on the reported sample data collected at the processor 300 of LME 30.

III. An algorithm or instructions for collecting sampling data and computing latency at the processor 300 of the LME 30 based on the collected samples from the agents 10a/20a.

The example embodiment of the system and method makes it possible to establish a reliable solution for latency measurement based on periodic sampling at advantageous points within a network slice, and enables a "best tradeoff" between an accuracy of the measurements and a signaling and processing burden that they impose on the communication network 50 infrastructure.

Figure 5:
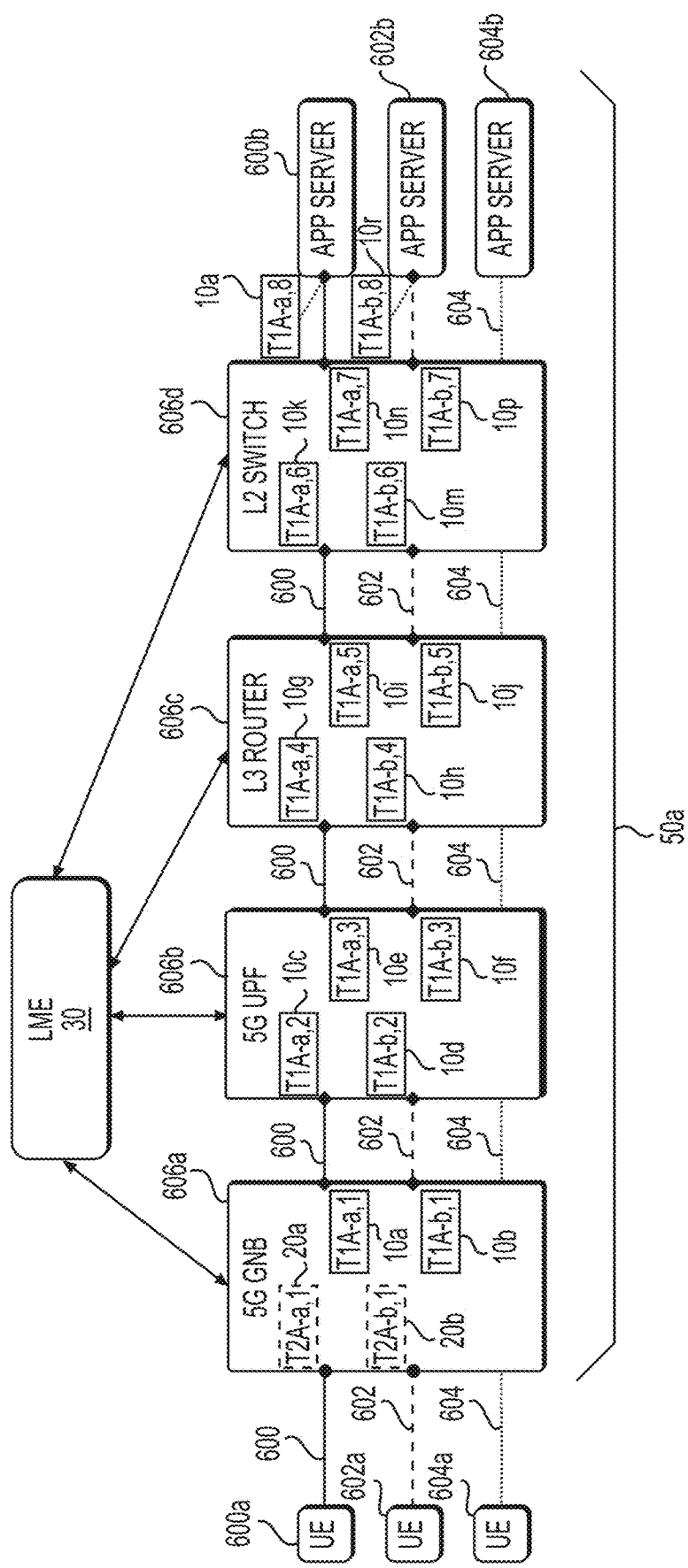
FIG. 5 illustrates an instantiation of the system for latency measurement in a representative 5G communication network with multiple slices, in accordance with an example embodiment.

In an example embodiment, the communication network may be a 5G network 50a that is a packet network. Therefore, FIG. 5 illustrates an instantiation of the system 100 for latency measurement in a representative 5G communication network 50a with multiple slices 600, 602, 604, in accordance with an example embodiment. In particular, FIG. 5 illustrates the instantiation of components of the example embodiments for three slices 600, 602, 604 that share a common physical infrastructure. The slices are coupled with a termination of a same physical link, where LMAs (nodes 20a, 20b, 10a, 10b, etc.) may at any time belong to distinct slices 600, 602, 604 that are logically independent but may be implemented as a single entity when associated with network functions that are shared by the multiple slices 600, 602, 604. Each of the respective LMA nodes 10a, 20a may be grouped into portions of the network 50a, where the portions may include a 5G gNB (base station) 606a, a 5G user plane function (UPF) 606b, a layer 3 (L3) router, and a layer 2 (L2) switch, as an example.

FIG. 5 illustrates that the three network slices 600, 602, 604 provide data paths between respective application servers 600b, 602b, 604b and client devices (UEs) 600a, 602a, 604a. Each of the application servers 600b, 602b, 604b belongs to a different respective slice 600, 602, 604, where the application servers 600b, 602b, 604b may provide services or content to the respective UEs 600a, 602a, 604a. For this reason, the links between an application server 600b and a respective L2 switch 606d port are internal links, coupled with T1LMAs 10q, 10r (T1A-m,n is the n-th T1LMA of slice m). Meanwhile, the link between the 5G gNB 606a and the UE 600a is an external links because the UE 600a is not within the slice boundaries of the network 50a, so the 5G gNB 606a endpoints of those links are coupled with T2LMAs 20a (T2A-p,q is the q-th T2LMA of slice p). Not all slices supported by the same physical infrastructure are necessarily equipped with the latency measurement capabilities of the instant example embodiments. In FIG. 5, only the two top slices 600, 602 are. A single LME 30 may control respective LMAs 10a, 20a for the slices 600, 602 being monitored and controlled.

EXAMPLE EMBODIMENT OF THE METHOD

Operation of Type 1 (Node 10a) LMA

The processor 200 of the T1LMA (node 10a) may start sampling packets that are received by the node 10a following a period in time when the node 10a receives a trigger (request) message from the LME 30, where the sampled packets carry a given Network Slice ID (NSID) which designates the identity of a designated slice. It should be noted that the nature and format of the NSID is not within the scope of the instant example embodiments. Because the node 10a is associated with a link endpoint that handles traffic in two directions, a distinct trigger is required for each traffic direction, and therefore the NSID can specify the traffic direction for sampling. The trigger includes the following set of items (that denote the network slice ID, the sample start time, and the sample end time): <NSID, sample_start_time, sample_end_time, direction>. After receiving the trigger message, the processor 200 of the node 10a processes all packets of the designated slice that are being transmitted in the specified direction that are received during the designated sample time-window. It is noted that the sample time-window (sample_start_time and sample_end_time) should be a time period that is in the future, as compared to a time of arrival of the trigger message that is received by the node 10a from LME 30. When the processor 200 of node 10a processes a packet, it adds a packet report record to a running log for the current sampling period. The packet report record may contain at least the following items: <packet_ID, packet_size, timestamp>, where packet_ID may be a unique signature identifier for the packet, packet_size is a length of the packet that may be measured in bytes, and timestamp is a time of generation of the packet report record according to the time reference shared by LME 30, node 10a, and the other LMAs of the slice that is being monitored. When the time reference reaches sample_end_time (i.e., the end of the sample time-window) the processor 200 of node 10a may stop creating packet report records and send to the LME 30 the entire log accumulated for the sampling period.

Operation of Type 2 (Node 20a) LMA

The T2LMA (node 20a) is associated with a network endpoint for external links (links that communicate with nodes outside the network 50). One example of an external link is a wireless access link for mobile wireless networks, where the link may be communicating with an end user (user equipment). One example of placement of the network endpoint of the wireless access link is a medium access control (MAC) layer of a radio access network (RAN) protocol stack. The MAC layer includes the scheduler for access to the wireless medium in both downlink (DL) and uplink (UL) directions. This section describes an instantiation of the node 20a in association with the wireless link scheduler of the Radio Access Network.

Figure 6:
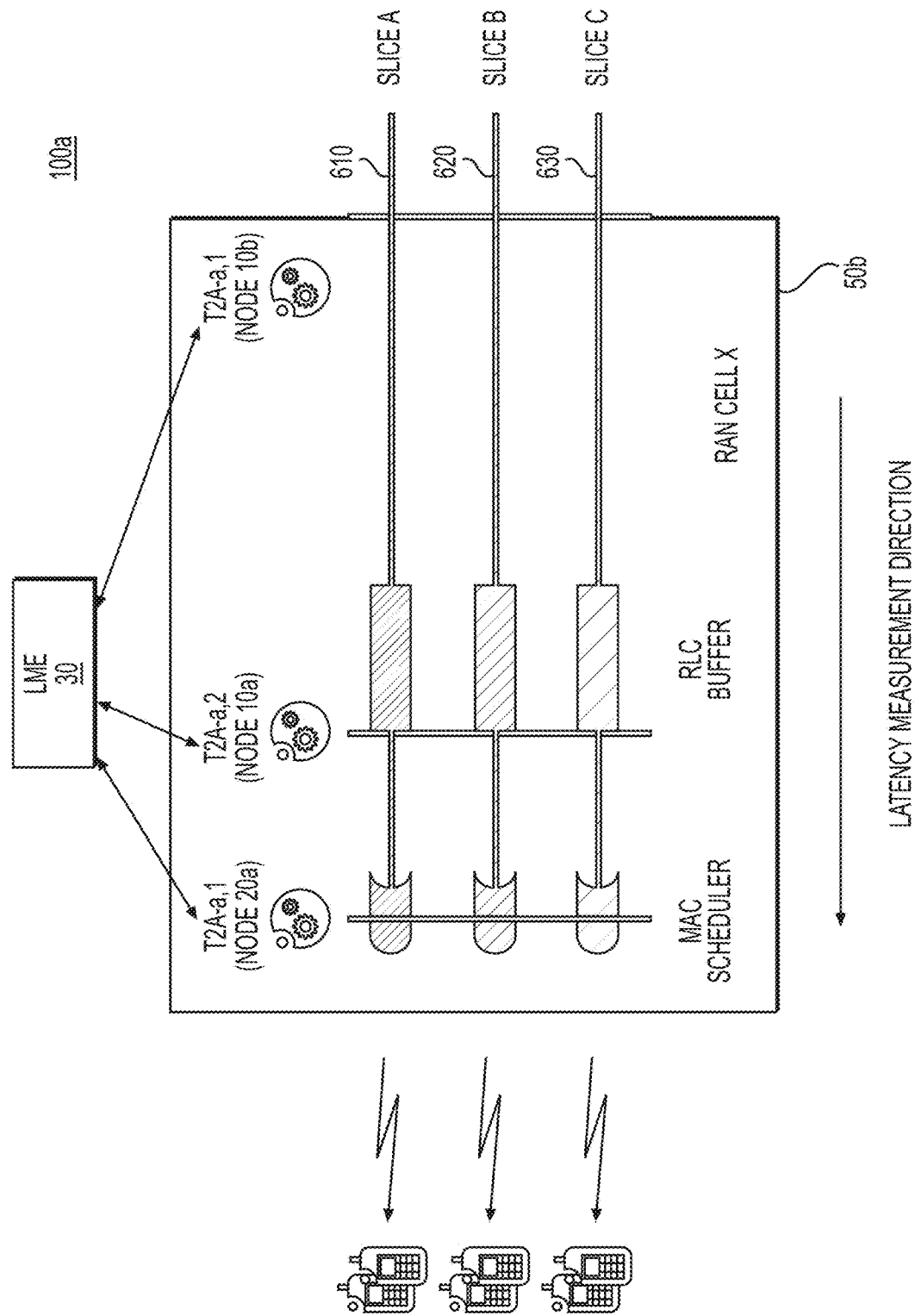
FIG. 6 illustrates a system for latency measurement in a mobile radio access network (RAN) communication network, in accordance with an example embodiment.

FIG. 6 illustrates a system 100a for latency measurement in a mobile radio access network (RAN) cell 50b, in accordance with an example embodiment. The mobile RAN 50b is shared by three network slices 610, 620, 630 (with respective NSIDs denoted as a, b, and c). The description that follows focuses on an operation of the system 100a for latency measurement specifically for slice 610 (with NSID a). T1A-a,1 (node 10b) and T1A-a,2 (node 10a) are T1LMAs associated with the endpoint of the link that connects the RAN cell 50b to the core network (T1A-a,1) and with the interface between radio link control (RLC) and MAC layers in the RAN protocol stack (T1A-a,2). The two T1LMAs may be implemented jointly with T1LMAs that serve other slices at the same data-path points. T2A-a,1 (node 20a) serves slice a in association with the MAC scheduler (T2LMAs of other slices may be also implemented jointly).

The processor 400 of node 20a computes a latency contribution of the wireless access link using information that it obtains from the MAC scheduler at every transmission time interval (TTI). The information may include the following data, where this description refers to a downlink (DL) data direction (though this type of data would be the same for the uplink (UL) data direction):

A. Aggregate physical resource block (PRB) rate PRB_agg(a, $\Delta$t, DL) for all DL bearers of slice a computed over time interval of duration $\Delta$t and (optionally) further averaged (or "smoothed").

B. Average PRB rate PRB_avg(a, $\Delta$t, DL) for a virtual very active (VA) DL bearer of the slice a (where a 'VA bearer' almost always has data available to send wirelessly). In one embodiment, PRB_avg(a, $\Delta$t, DL) may be computed as described in U.S. Pat. No. 9,794,825, issued Oct. 17, 2017, the entire contents of which is incorporated herein by reference in its entirety, and averaged over time interval $\Delta$t.

C. Average number of VA DL bearers NVA_avg(a, $\Delta$t, DL) in the slice. In an embodiment, NVA_avg(a, $\Delta$t, DL) may be computed as described in U.S. Pat. No. 9,794,825, and averaged over time interval $\Delta$t.

It should be noted that PRB_agg(a, $\Delta$t, DL) represents the average amount of DL cell resources allocated to slice a, and PRB_avg(a, $\Delta$t, DL) and NVA_avg(a, $\Delta$t, DL) depend upon PRB_agg(a, $\Delta$t, DL) and upon application-dependent properties of the traffic flows in slice a.

The processor 400 of node 20a computes the DL wireless link latency L(a, D, $\Delta$t, DL) for D bits of slice a during a time interval $\Delta$t, where $\Delta$t is the time it takes to transmit D bits at the average data rate obtained by a very active (VA) bearer of the slice. The same processor 400 computes the UL wireless link latency L(a, D, $\Delta$t, UL).

If C(a, $\Delta$t, DL) is an average number of useful bits per PRB (not counting retransmissions) allocated by the scheduler during a time interval $\Delta$t across all DL bearers of slice a, and computed as described in E. Grinshpun et al., "Long-term application-level wireless link quality prediction," 36*th IEEE Sarnoff Symposium*, September 2015 (available)

which is incorporated by reference in its entirety into this document, the processor 400 of node 20a computes the DL wireless link latency as follows:

$$L(a,D,\Delta t,DL)=D/(PRB\_avg(a,\Delta t,DL)*C(a,\Delta t,DL)) \quad \text{Eq. 1}$$

The equation for the UL latency is the following:

$$L(a,D,\Delta t,UL)=D/(PRB\_avg(a,\Delta t,UL)*C(a,\Delta t,UL)) \quad \text{Eq. 2}$$

In the equations Eq.1 and Eq.2 average latency independent of D may be computed by selecting in Eq.1: D=D1+D2, where D1 is an average IP packet size for the slice and D2 is an average size of the buffer accumulating packets before sending them over the link (e.g. average size of Radio Link Control (RLC) buffer).

The processor 400 of node 20a computation for latency, as described above, is not CPU-intensive and does not require storage of large amounts of data. The computation can therefore be performed continuously by the processor 400 of node 20a. In an embodiment, the processor 300 of LME 30 triggers the transmission of an up-to-date latency value with a data message that carries the following parameters: <NSID, D, Δt, direction>. The processor 300 of LME 30 sets D and Δt based on the traffic SLAs of the slice, using larger values of D and Δt for slices with high expected traffic volume, and smaller values for slices with low expected traffic volume. The processor 400 of node 20a may also send its latency reports periodically, or upon a time in which a configured (determined) threshold is exceeded.

LME 30 Operation

The processor 300 of LME 30 receives the sample reports from the node 10a and node 20a and combines them to compute the end-to-end latency for each monitored slice and for selected portions of the data path within each monitored slice. The processor 300 of the LME 30 sets the frequency of the sampling periods for each node 10a/20a it controls and the start and end times of the sampling periods for each node 10a it controls.

Figure 7:
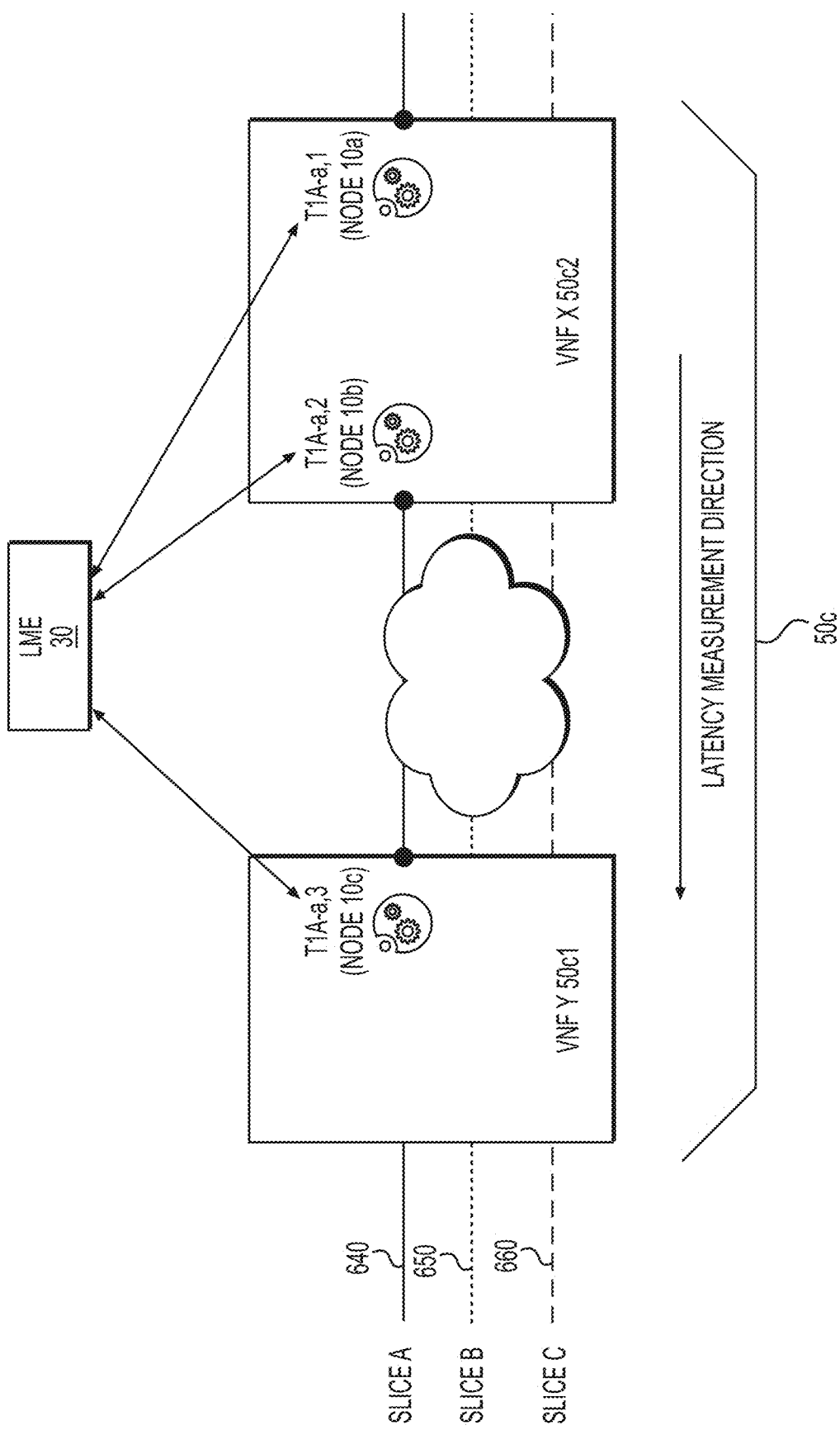
FIG. 7 illustrates an operation of the first measurement node, in accordance with an example embodiment.

FIG. 7 illustrates an operation of the first measurement node (node 10a), in accordance with an example embodiment. In particular, FIG. 7 illustrates an example where the nodes of a network 50c (similar to the network 50 of FIG. 1), though this network 50c involves virtualized network function (VNF) instances 50c1/50c2. VNF X (50c1) and VNF Y (50c2) are shared by three slices 640, 650, 660 (with respective NSIDs, or "network slice identifiers," that are denoted by a, b, and c). The description that follows focuses on slice a only, for which the processor 300 of LME 30 controls the operation of three node (nodes 10a, 10b, 10c) instances (specifically, nodes 10a/10b in VNF X, and node 10c in VNF Y). The T1LMAs of slice a may be instantiated as standalone functions or jointly with T1LMAs of other slices that are associated with the same link endpoints.

The respective processors 200 of nodes 10a, 10b, 10c collect sets of consecutive packet report records based on the trigger messages that they receive from the processor 300 of LME 30, and send them to the LME 30 as soon as the respective sampling periods reach their end times. The processor 300 of LME 30 uses the sets of packet report records to compute the latency of the data path from VNF X to VNF Y, where the data path may consist of a single link (possibly virtual), or multiple concatenated links, possibly joining other VNF instances.

Scalability requires the duration H of the T1LMA sampling periods to be as short as possible. However, shortening the sampling periods reduces the size of the intersection of the sets of packet identifiers collected at the endpoints of the latency measurement path. As the processor 300 of the LME 30 keeps collecting sets of packet report records, the processor 300 of the LME 30 can fine-tune both the durations and the start times of the sampling periods at the measurement endpoints to increase the size of the intersection set.

In an embodiment, the processor 300 of the LME 30 uses the following method to control the parameters of the sampling periods when measuring the latency between endpoints of the measurement data path.

First, the processor 300 of the LME 30 must set the start and end times of the sampling periods at the T1LMAs of the measurement path endpoints. Let t(a, 2, start) be the start time of the sampling period at T1A-a,2 (in VNF X), and t(a, 3, start) be the start time of the sampling period at T1A-a,3 (in VNF Y). The end times of the same periods are t(a, 2, end) and t(a, 3, end). Accordingly, the durations of the sampling periods at the two T1LMAs are H(a, 2)=t(a, 2, end)−t(a, 2, start), and H(a, 3)=t(a, 3, end)−t(a, 3, start). Let E(a, 2, 3) be the expected latency from T1A-a,2 to T1A-a,3 based on the most recent measurements, and S(a, 2, 3) a small fraction of E(a, 2, 3) (e.g., S(a, 2, 3) may be defined as the product of a configurable factor and the standard deviation of the same sample that yields the average E(a, 2, 3)). The processor 300 of the LME 30 sets the start and end times at the downstream T1LMA as follows:

$$t(a,3,\text{start})=t(a,2,\text{start})+E(a,2,3)-S(a,2,3),$$

$$t(a,3,\text{end})=t(a,3,\text{start})+H(a,2)+S(a,2,3). \quad \text{Eq. 3}$$

In this way the duration of the sampling interval H(a, 3) at the downstream T1LMA (T1A-a,3) is longer than the interval H(a, 2) at the upstream T1LMA (T1A-a,2) by 2*S(A, 2, 3).

Next, the processor 300 of the LME 30 must compute the latency from T1A-a,2 to T1A-a,3 using the sets of packet report records received from the two T1LMAs.

Figure 8:
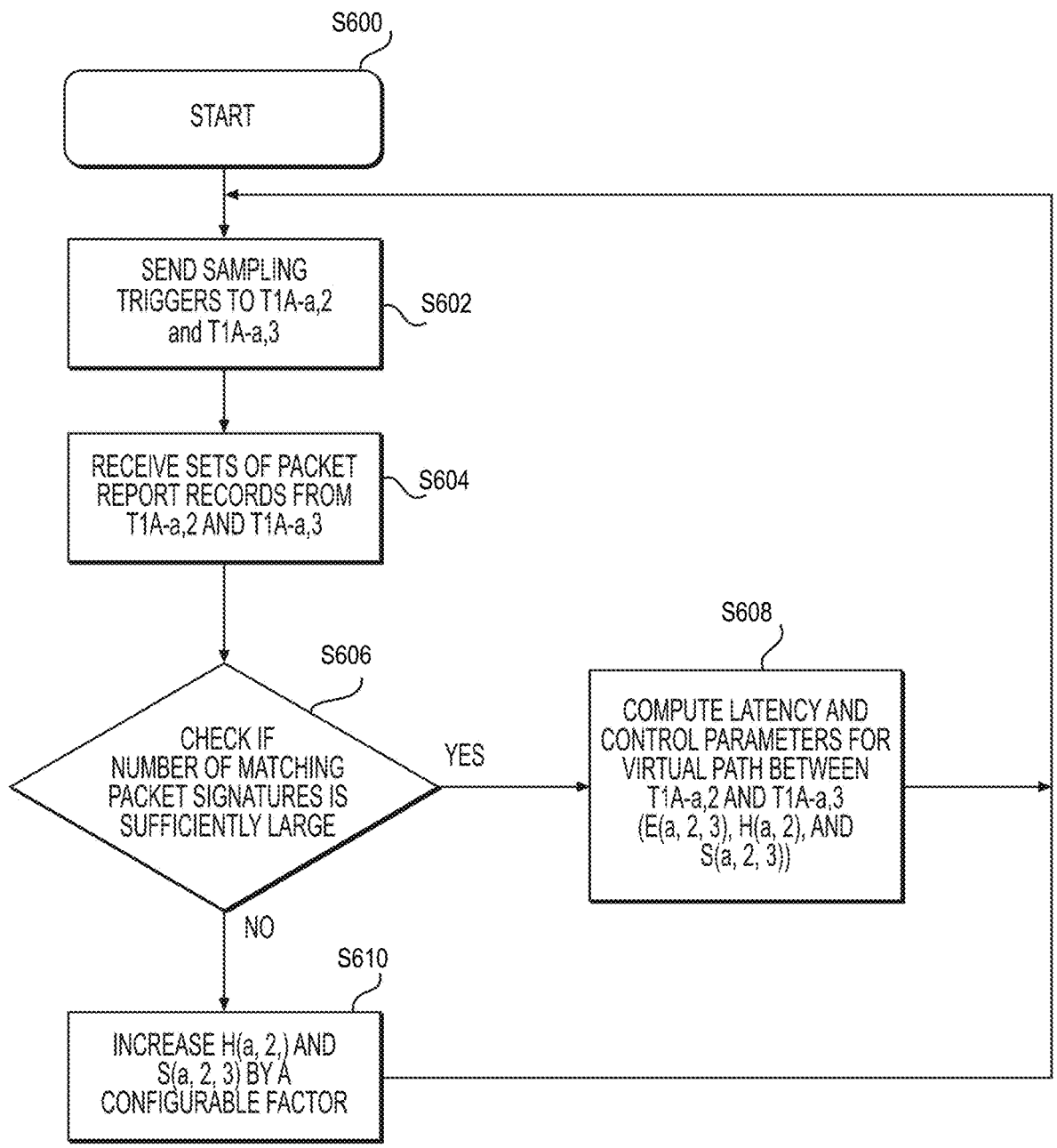
FIG. 8 illustrates a method of the central node, in accordance with an example embodiment.

FIG. 8 illustrates a method of the central node (LME) 30, in accordance with an example embodiment. In particular, FIG. 8 describes a method of operation of the LME 30 in conjunction with T1LMAs T1A-a,2 and T1A-a,3, including the processing of the packet report record sets for controlling the sampling parameter H and S and for computing the average latency E. As stated above, the LMCM 300a, LMMT1 and LMMT2 may include computer-readable instructions for the respective processors 300, 200, 400 (for the LME 30, node 10a and node 20a) to perform the steps of this method.

In step S600, the processor 300 of LME 30 may commence the method by determining that latency measurements and latency control measures are needed. This start to the method may be accomplished on a regular periodic schedule, a command from a mother node, a manual command from a network operator, based on an operator policy associated with a network event such as an addition or reconfiguration of a network slice, a detected degradation of application quality of experience, detected network congestion, etc.

In step S602, the controller 300 sends sample triggers (request messages) to node in the network 50. The nodes may be to a node 10a within the network 50, or the nodes may also be nodes 20a that have links that extend outside of the network 50. Once the nodes 10a and/or 20a receive the request message, they take measurements and compile packet reports commensurate with the example embodiments described above.

In step S604, the processor 300 of LME 30 receives the packet reports from nodes 10a and/or 20a, and in step S606 the processor 300 determines matching signatures (as described above), where this determination may also involve determining a threshold numerical value quantifying a number of matches. The threshold numerical value may, for instance, be a total number of matches.

If in step S606 the processor 300 determines that enough matches are present, then in step S608 the processor 300 may compute latency information, or otherwise investigate latency information, for the matches. Specifically, the processor 300 may compute latency and control parameters, where the latency and control parameters may be for end-to-end latency, or a latency of slice segment within the end-to-end transmission (as described above). In an embodiment, processor 400 for node 20a may optionally determine this latency information and then send the latency information to the LME 30, as opposed to the processor 30 of LME 30 determining the latency information. And therefore, in step S608 the processor 300 may analyze the latency information for the matches. In an embodiment, in step S608, the processor 300 may control an operation of the network in response to the latency analysis. This may be accomplished by re-routing slices through different nodes, re-routing slices through different configurable layers (PHY layer, MAC layer, PDCP layer, user plane layer) of a same node and/or changing the settings of these layers, re-routing slices through different configurable modes of the scheduler and/or RLC of the same node and/or changing the settings of the scheduler and/or RLC, notifying network nodes to adjust settings, increase or decrease network throughput, etc., where these actions to control an operation of the network may optionally be coordinated with other LMEs 30, a central office for the network (not shown in the drawings), or otherwise coordinated with a number of nodes within the network 50 or even nodes outside of the network 50. Following step S608 the method may be repeated (where the method resorts back to step S602).

If in step S606 the processor 300 determines that not enough matches are present, then in step S6610 the processor 300 of LME 30 may increase H(a, 2) and S(a, 2, 3), with a purpose of increasing a number of matches during another iteration of the method. Following step S610 the method may be repeated (where the method resorts back to step S602).

The processor 300 of LME 30 may disable the collection of packet report records from intermediate T1LMAs when the latency measurements between the slice endpoints are stable, and activate it again when the latency measurements increase or when the sets of packet report records from the slice endpoints become severely misaligned, with only little or null intersection.

The processor 300 of LME 30 computes the latency of individual packets between two T1LMAs by matching their identifiers (signatures) in the respective sets and subtracting their timestamps. The processor 300 of LME 30 accumulates the latency samples in combined metrics (e.g., an average of choice) and further normalizes them. The type of normalization depends on the traffic properties of the slice traffic. For example, for slices with consistently high volume of traffic the normalization may be done over a reference data unit size D; for low-volume bursty traffic, instead, the normalization may be done over the number of packets processed during a time Δt.

It should be understood that the nodes of the example embodiments described herein can be physical or virtual routers, switches, 4G wireless eNodeBs, SGW, PGW, MME, 5G wireless nodes (gNodeB, UPF,), gateways, or other structural elements that are capable of fulfilling the functions and method steps outline in this document.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the example embodiments. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the example embodiments, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included.

Example embodiments may be utilized in conjunction with various telecommunication networks and systems, such as the following (where this is only an example list): Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); $3^{rd}$ Generation Partnership Project LTE (3GPP LTE); and 5G networks.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of controlling an operation of a communication network, comprising:
transmitting, by at least one first processor of a central node, request messages to at least one first network node, the request messages each including at least a sampling time-window and a network slice identifier, the sampling time-window defining a duration of time, the network slice identifier identifying a designated network slice within the communication network;
receiving, at the at least one first processor, packet reports from the at least one first network node, the packet reports including latency information for packets that are processed by the at least one first network node during the sampling time-window for the designated network slice; and
controlling, by the at least one first processor, the operation of the communication network based on the latency information.

2. The method of claim 1, wherein the at least one first network node includes at least one first-type of network node with a first link in the designated network slice, the first link having a termination endpoint that is within the communication network.

3. The method of claim 1, wherein the at least one first network node includes at least one second-type of network node with a second link in the designated network slice, the second link having a termination endpoint that is outside the designated network slice.

4. The method of claim 2, wherein the receiving of the packet reports includes,
receiving, from the first-type of network node, a first-type of packet reports for the designated network slice, the first-type of packet reports each including,
packet identifier information,
packet size information, and
timestamp information.

5. The method of claim 3, wherein the at least one first network node includes at least one first-type of network node with a first link in the designated network slice, the first link having a termination endpoint that is within the communication network, and
the receiving of the packet reports includes,
receiving, from the first-type of network node, a first-type of packet reports for the designated network slice, the first-type of packet reports each including,
packet identifier information,
packet size information, and
timestamp information; and
receiving, from the second-type of network node, a second-type of packet reports for the designated network slice, the second-type of packet reports each including latency information for the second-type of network node.

6. The method of claim 1, wherein the network slice identifier identifies a direction of communication for the designated network slice, the direction being one of an uplink direction and a downlink direction.

7. The method of claim 4, wherein the central node and the first-type of network node are synchronized to a same network clock for the communication network, and the request messages to the at least one first-type of network node includes a start time defined by the sampling time-window.

8. The method of claim 7, wherein the at least one first-type of network node includes a downstream first-type of network node and an upstream first-type of network node,
the transmitting of the request messages including,
transmitting a first request message with a first sampling time-window to the downstream first-type of network node, the first sampling time-window defining a first start time and a first duration of time, and
transmitting a second request message with a second sampling time-window to the upstream first-type of network node, the second sampling time-window defining a second start time and a second duration of time,
the first duration of time being one of the same and different than the second duration of time.

9. The method of claim 8, wherein the receiving of the packet reports includes,
receiving a first packet report from the downstream first-type of network node, the first packet report including one first set of packet identifier information associated with one first set of timestamp information, and
receiving a second packet report from the upstream first-type of network node, the second packet report including one second set of packet identifier information associated with one second set of timestamp information.

10. The method of claim 9, further comprising:
calculating the latency information by,
matching identifier information between the one first set of packet identifier information and the one second set of packet identifier information to arrive at a matched subset of identifier information, and
determining a difference between a first portion of the one first set of timestamp information and a second portion of the one second set of timestamp information, the first and second portions being associated with the matched subset of identifier information.

11. A method of controlling an operation of a communication network in a system, the system including a central node and at least one first network node, the method comprising:
transmitting, by at least one first processor of the central node, request messages to at least one second processor of the at least one first network node, the request messages each including at least a sampling time-window and a network slice identifier, the sampling time-window defining a duration of time, the network slice identifier identifying a designated network slice within the communication network;
creating, by the at least one second processor, packet reports upon receipt of the request message, the packet reports including latency information for packets that are processed by the at least one first network node during the sampling time-window for the designated network slice;
receiving, at the at least one first processor, the packet reports from the at least one second processor; and
controlling, by the at least one first processor, the operation of the communication network based on the latency information.

12. The method of claim 11, wherein the at least one first network node includes at least one first-type of network node with a first link in the designated network slice, the first link having a termination endpoint that is within the communication network.

13. The method of claim 11, wherein the at least one first network node includes at least one second-type of network node with a second link in the designated network slice, the second link having a termination endpoint that is outside the designated network slice.

14. The method of claim 12, wherein the receiving of the packet reports includes,
receiving, from the first-type of network node, a first-type of packet reports for the designated network slice, the first-type of packet reports each including,
packet identifier information,
packet size information, and
timestamp information.

15. The method of claim 13, wherein the at least one first network node includes at least one first-type of network node with a first link in the designated network slice, the first link having a termination endpoint that is within the communication network, and
the receiving of the packet reports includes,
receiving, from the first-type of network node, a first-type of packet reports for the designated network slice, the first-type of packet reports each including,
packet identifier information,
packet size information, and
timestamp information; and
receiving, from the second-type of network node, a second-type of packet reports for the designated network slice, the second-type of packet reports each including latency information for the second-type of network node.

16. The method of claim 11, wherein the network slice identifier identifies a direction of communication for the designated network slice, the direction being one of an uplink direction and a downlink direction.

17. The method of claim 14, wherein the central node and the first-type of network node are synchronized to a same network clock for the communication network, and
the request messages to the at least one first-type of network node includes a start time defined by the sampling time-window.

18. The method of claim 17, wherein the at least one first-type of network node includes a downstream first-type of network node and an upstream first-type of network node,
the transmitting of the request messages including,
transmitting a first request message with a first sampling time-window to the downstream first-type of network node, the first sampling time-window defining a first start time and a first duration of time, and
transmitting a second request message with a second sampling time-window to the upstream first-type of network node, the second sampling time-window defining a second start time and a second duration of time,
the first duration of time being one of the same and different than the second duration of time.

19. The method of claim 13, wherein the creating of the packet reports includes,
calculating, by the at least one second processor of the at least one second-type of network node, physical resource block (PRB) rate information and bearer information that includes a quantification of a number of very active bearers, and
determining, by the at least one second processor, the latency information based on the PRB rate information and the bearer information.

20. A central node, comprising:
a memory storing computer-readable instructions; and
at least one first processor configured to execute the computer-readable instructions such that the at least one first processor is configured to,
transmit request messages to at least one first network node, the request messages each including at least a sampling time-window and a network slice identifier, the sampling time-window defining a duration of time, the network slice identifier identifying a designated network slice within a communication network,
receive packet reports from the at least one first network node, the packet reports including latency information for packets that are processed by the at least one first network node during the sampling time-window for the designated network slice, and
control an operation of the communication network based on the latency information.

* * * * *